Nov. 17, 1959
I. A. SMITH
2,912,886
EXTRUDING APPARATUS
Filed April 22, 1957
2 Sheets-Sheet 1
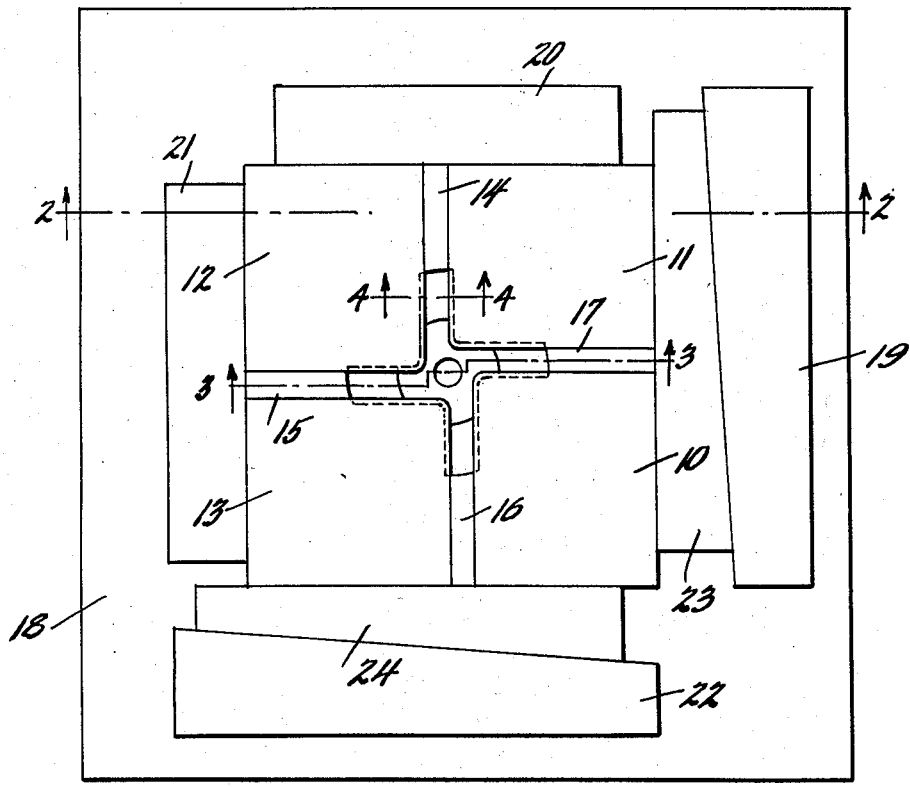
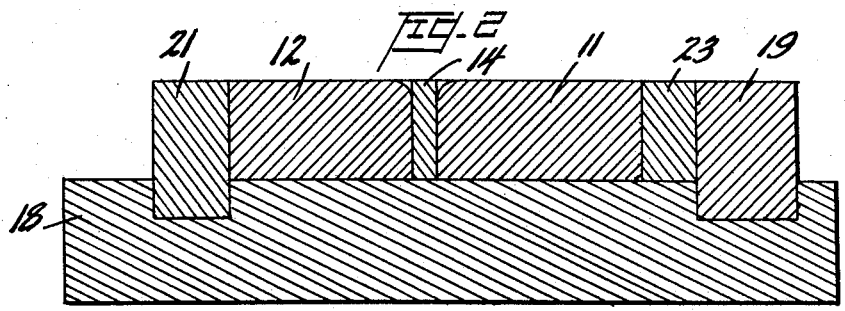
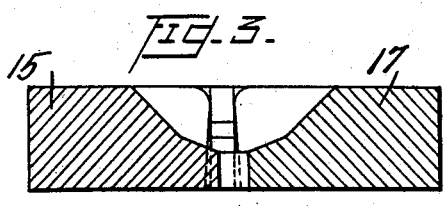
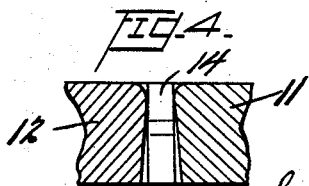
INVENTOR
Ian A. Smith
BY Watson, Cole, Grindle & Watson
ATTORNEYS Nov. 17, 1959      I. A. SMITH      2,912,886
EXTRUDING APPARATUS Filed April 22, 1957      2 Sheets-Sheet 2

INVENTOR
Ian A. Smith

BY
Watson, Cole, Grindle & Watson
ATTORNEYS ated Nov. 17, 1959

2,912,886

EXTRUDING APPARATUS

Ian A. Smith, Willimantic, Conn., assignor to American Screw Company, Willimantic, Conn., a corporation of Rhode Island Application April 22, 1957, Serial No. 654,277

7 Claims. (Cl. 76—90)

This invention relates to extruding methods and apparatus, and more particularly to a method of forming screw driver bits and the like by extrusion, and a sectional extrusion die for use in the said method. The present invention has been found especially advantageous for use in producing screw driver bits formed in accordance with United States Patent No. 2,848,024, but is, of course, adaptable for use in producing other articles of generally similar nature, for example header punches used for the production of recessed head screws in which the recesses have vertical surfaces, in which case the punches for producing such recesses must of course have corresponding vertical surfaces. By "vertical" surfaces is meant those surfaces which are parallel, or nearly so, to the longitudinal axis of the driver bit, punch or other article. The present method is especially advantageous for producing tools having recess-forming or recess-engaging ends which are formed to provide a central nib and a plurality of wings and in which the opposed side walls of each wing are exactly parallel, i.e., the wings have neither vertical nor radial taper.

Hitherto, screw driver bits and punches, such as those with which the present invention is concerned, were finished by end milling to final dimensions. End milling was chosen over form milling, because by using a small cutter the axial length of the gash or cut could be held to a minimum, thus insuring maximum rigidity and freedom from torsional flexure in the finished article, for example a driver bit. Great strength and resistance to torsional flexure is a very important requirement of driver bits for use in connection with fasteners which are tightened under extremely heavy torque, for example, fasteners of the type disclosed in United States Patent No. 2,847,894. However, end milling has the disadvantage that, because of its small diameter, the cutter is predisposed to excessive wear resulting in undesirable radial wing taper of the finished article; moreover, the cutter pressure tends to cause deflection of the arbor of the cutter, which again results in undesirable radial wing taper of the finished article. These conditions are further aggravated by deflection of the bit or other article, itself, under cutting pressure, which results in an undesirable axial wing taper.

Accordingly, it is the general object of the present invention to provide a method of finishing screw driver bits and other articles of the character described by extrusion, whereby the aforesaid disadvantages, of either form milling or end milling of the wing surfaces, are overcome.

More specifically, it is an object of this invention to provide an extrusion method in which the recess-engaging or recess-forming end of a driver bit, punch or the like is machined into general conformity with the desired finished tool end but with said end portions of greater thickness than desired in the finished tool, and extruding said end portions under pressure to reduce their wing thickness and to bring their opposed wing surfaces into exact parallelism.

Because of the nature of the extruding operation under consideration, and the somewhat complex form of the desired finished article, it has been necessary to devise a new and special extrusion die for use in said operation. Such a die, adapted for extruding a tool end having a plurality of outwardly extending wings, preferably four in number, cannot be produced economically from a one-piece blank, as is customary in producing extrusion dies of more conventional nature. Accordingly, a further object of the present invention is the provision of an extrusion die for forming tool ends provided with parallel longitudinally extending surfaces, such die comprising a plurality of metal bodies assembled together to define a recess generally in conformity with the desired finished tool end, certain pairs of said bodies having mutually opposed, spaced parallel surfaces defining therebetween a choke, each body of each said pair having a tapered approach surface and a tapered relief surface merging with said choke-forming surface at opposite edges thereof, and releasable means for securing all of said bodies tightly together. The bodies provided with the aforesaid choke-forming surfaces may be separated and spaced by other bodies which also serve to define the bottom of said recess. The releasable means for securing the several metal bodies tightly together may comprise fixed upstanding abutments or pillar blocks and cooperating wedges or, alternatively, a system of dowels and bolts, as will be described.

The choke-forming surfaces which are parallel to each other may also be parallel to the axis of the tool, in which case the finished tool end is provided with wing surfaces which are also parallel to the tool axis; or the said choke-forming surfaces may be inclined, clockwise, or counterclockwise, to the tool axis in which case the finished tool end is provided with wings which are inclined or "hooked" for superior recess-engaging qualities for tightening or removal of recessed fasteners, as the case may be.

Other and further objects, features and advantages will be apparent from the description which follows, read in connection with the accompanying drawings in which Figure 1 is a plan view of an extrusion die made in accordance with the invention;

Figures 2, 3, and 4 are sectional views on lines 2—2, 3—3 and 4—4, respectively, of Figure 1;

Figure 5:
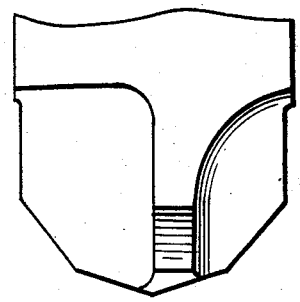
Figure 5 is an elevational view of a driver bit produced in accordance with the present invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the sectional extrusion die there illustrated is adapted for producing driver bits or header punches for engaging or forming, as the case may be, screw head recesses of the type disclosed in co-pending application Serial No. 494,726, and comprising four identical corner blocks 10, 11, 12 and 13 and four identical spacer blocks 14, 15, 16 and 17, all supported on a suitable base 18. The base 18 is provided with upwardly projecting pillar blocks 19, 20, 21 and 22 which may be integral with the base 18 or may be produced separately and rigidly affixed to the base in any suitable manner. One pillar block of each opposed pair, and in the illustrated embodiment the pillar blocks 19 and 22 are so formed, is provided with its inwardly facing surface inclined to the adjacent outer side surfaces of the corner blocks of the die proper. That is, the inwardly facing surface of pillar block 19 is inclined to the adjacent side surfaces of corner blocks 10 and 11, and the inwardly facing surface of pillar block 22 is inclined to the adjacent side surfaces of corner blocks 10 and 13. The other pillar block of each opposed pair has its inwardly facing surface exactly parallel to the adjacent side surfaces of the corresponding corner blocks, which are adapted to closely abut the said pillar blocks when the extrusion die is in assembled condition. After the corner blocks and spacer blocks are assembled together in the relationship illustrated in Figure 1, a wedge 23 is driven between pillar block 19 and the adjacent side surfaces of corner blocks 10 and 11, and a wedge 24 is driven between pillar block 22 and corner blocks 10 and 13, with the result that the sectional extrusion die is securely and rigidly maintained in assembled condition.

Figure 6:
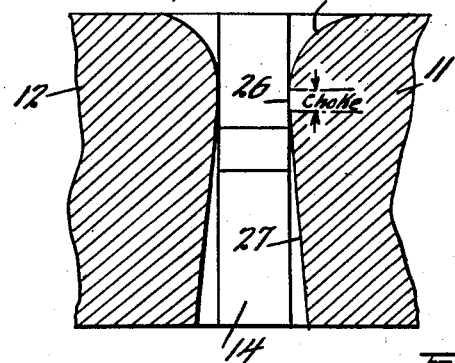
Figure 6 is an enlarged fragmentary sectional view corresponding to Figure 4.

Referring now to Figure 6, it will be seen that those surfaces of the corner blocks which combine to form the die aperture are machined to provide an approach taper, a choke forming surface, and a relief taper. The approach taper may take the form of a curved surface 25 as illustrated, or may take the form of a suitably inclined plane surface. The choke-forming surface 26 lies in a plane which is parallel to the axis of the die aperture, and, in order to avoid undue friction, is of relatively small vertical dimension. The relief taper 27 begins at the lower border of the choke-forming surface 26 and extends to the bottom surface of the corner block.

The corresponding surfaces of the several corner blocks are machined in the manner just described so that, when assembled, they define a die aperture conforming generally with the desired finished tool, the only significant departure from exact conformity therewith consisting in the inclination or taper of the relief portions aforesaid. As is well understood in the art, the choke portion of an extrusion die determines the finished dimension of those portions of the workpiece which pass therethrough.

Figure 7:
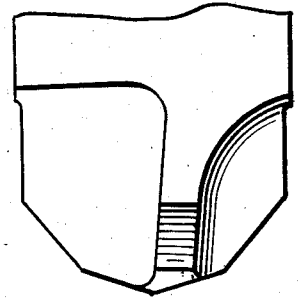
Figure 7 is a view similar to Figure 5 but illustrating a driver bit having hooked wings.
Figure 8:
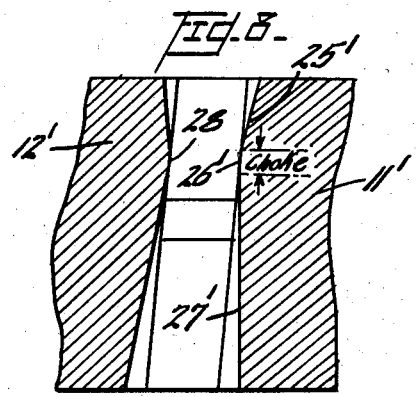
Figure 8 is a view similar to Figure 6 but showing an extrusion die suitable for forming the driver bit of Figure 7.

Referring to Figure 8 it will be noted that the choke-forming surface 26' of corner block 11' is inclined to the vertical, and the opposed choke-forming surface 28 of corner block 12' is similarly inclined, i.e. parallel to the surface 26'. The approach taper 25', which in this case is represented by a plane surface is disposed at a suitable "approach angle" to the choke-forming surface 26', and the relief taper 27' is correspondingly altered in inclination to afford an appropriate "relief angle." The corresponding surfaces of corner block 12', similarly, are suitably altered in inclination to provide suitable approach and relief angles and to cause the choke-forming surface 28 to be exactly parallel to the surface 26'. Corresponding surfaces of the several corner blocks are similarly finished, so that the assembled extruding die defines a recess in substantial conformity with the desired finished tool end illustrated in Figure 7. It will be appreciated that the relief angle has been considerably exaggerated in each of the several figures in which the angle is shown. It will also be understood that the statement that the recess defined by the extrusion die is "in substantial conformity" with the desired finished tool end refers only to that portion of the finished tool end which extends into and through the choke of the die during the extrusion operation.

In carrying out the method of the present invention with the aid of the extrusion die just described, the workpiece is first machined, preferably by end milling, into general conformity with the desired finished tool. The thickness of the wings of the driver or punch, however, after machining, exceeds the desired finished dimensions thereof by 2% to 5% or more, but not substantially in excess of 15% of the finished thickness. The tool end thus machined is then passed into the extrusion die under extruding pressure, which will depend to some extent upon the material being worked, until it engages the bottom of the die aperture. As is well understood in the art, because of the reduction in thickness of the wings of the tool, they are extended somewhat in length, the material of the wings actually passing through the choke at a speed which is in excess of the speed at which the shank of the tool is advanced. In the course of this operation, the material of the tool end is compressed and work-hardened, which improves the characteristics of the tool, notably its working life.

In finishing a tool end such as illustrated in Figure 7, the method just described is employed, using an extrusion die formed as described in connection with Figure 8. The result, in both cases, is the production of a tool end which is extremely accurate in dimension, and in which the opposite side surfaces of each wing are exactly parallel.

Figure 9:
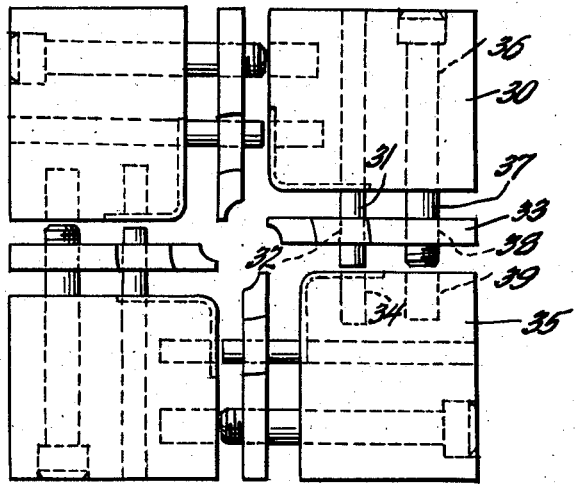
Figure 9 is an exploded plan view of an extrusion die similar to that of Figure 1, illustrating an alternative form of the releasable means for securing the several parts in assembled relation.

Figure 9 illustrates a sectional extrusion die which is exactly like that of Figures 1 and 2, except that each corner block is provided with a dowel pin and a bolt hole, and recesses for receiving the ends of a dowel pin and a bolt associated with an adjacent corner block. Each spacer block is also provided with apertures to accommodate a dowel pin and a bolt. Thus, corner block 30 is provided with a dowel pin 31 which extends through an aperture 32 in spacer block 33 and into a recess 34 in corner block 35. Corner block 30 is also suitably apertured as at 36 to receive a bolt 37 which extends through an aperture 38 in spacer block 33 and into a threaded recess 39 in corner block 35. The respective dowel pins associated with each of the corner blocks and engaging apertures in the spacer blocks and recesses in the adjacent corner blocks, assure proper and accurate assembly of the several parts, and the tightening of the several bolts 36 into the corresponding threaded recess 39 secures the assembly together in a releasable manner. Extrusion dies of Figures 1 and 9, respectively, are of course interchangeable in carrying out the method of the present invention.

Having thus described the invention, what is claimed as new and desired to be secured by Letters Patent is:

1. An extrusion die for forming tool ends provided with parallel longitudinally-extending surfaces, comprising a plurality of metal bodies assembled together to define a recess generally in conformity with the desired finished tool end, certain pairs of said bodies having mutually opposed, spaced parallel surfaces defining therebetween a choke, each body of each said pair having a tapered approach surface and a tapered relief surface merging with said choke-forming surface at opposite edges thereof, others of said bodies lying between and spacing the bodies of each said pair and defining the bottom of said recess, and releasable means for securing all of said bodies tightly together.

2. An extrusion die for forming tool ends provided with parallel longitudinally-extending surfaces, comprising a plurality of metal bodies assembled together to define a recess generally in conformity with the desired finished tool end, certain pairs of said bodies having mutually opposed, spaced parallel surfaces defining therebetween a choke, each body of each said pair having a tapered approach surface and a tapered relief surface merging with said choke-forming surface at opposite edges thereof and releasable means for securing said bodies tightly together with said choke-forming surfaces in spaced relation.

3. An extrusion die as defined in claim 2, said last means comprising a base member provided with fixed upstanding abutments, and wedging means for securing said assembled bodies between said abutments.

4. An extrusion die as defined in claim 2, said last means comprising threaded members extending through certain of said bodies and into threaded engagement with others of said bodies.

5. An extrusion die as defined in claim 2, all of said choke-forming surfaces lying in planes which are normal to the same plane.

6. An extrusion die as defined in claim 2, said choke-forming surfaces consisting in four opposed pairs, two of said choke-forming surfaces being provided on each of four said bodies, the choke-forming surfaces of each said body lying at right angles to each other.

7. An extrusion die as defined in claim 2, all of said choke-forming surfaces lying in planes which are equally inclined to the same plane.

References Cited in the file of this patent

UNITED STATES PATENTS

| | | |
|---|---|---|
| 235,308 | Snediker | Dec. 7, 1880 |
| 562,934 | Sullivan | June 30, 1896 |
| 1,266,830 | La Vercombe | May 21, 1918 |
| 2,537,029 | Cambern | Jan. 9, 1951 |
| 2,565,948 | Cambern | Aug. 28, 1951 |
| 2,627,192 | Jenney et al. | Feb. 3, 1953 |